Patented June 8, 1937

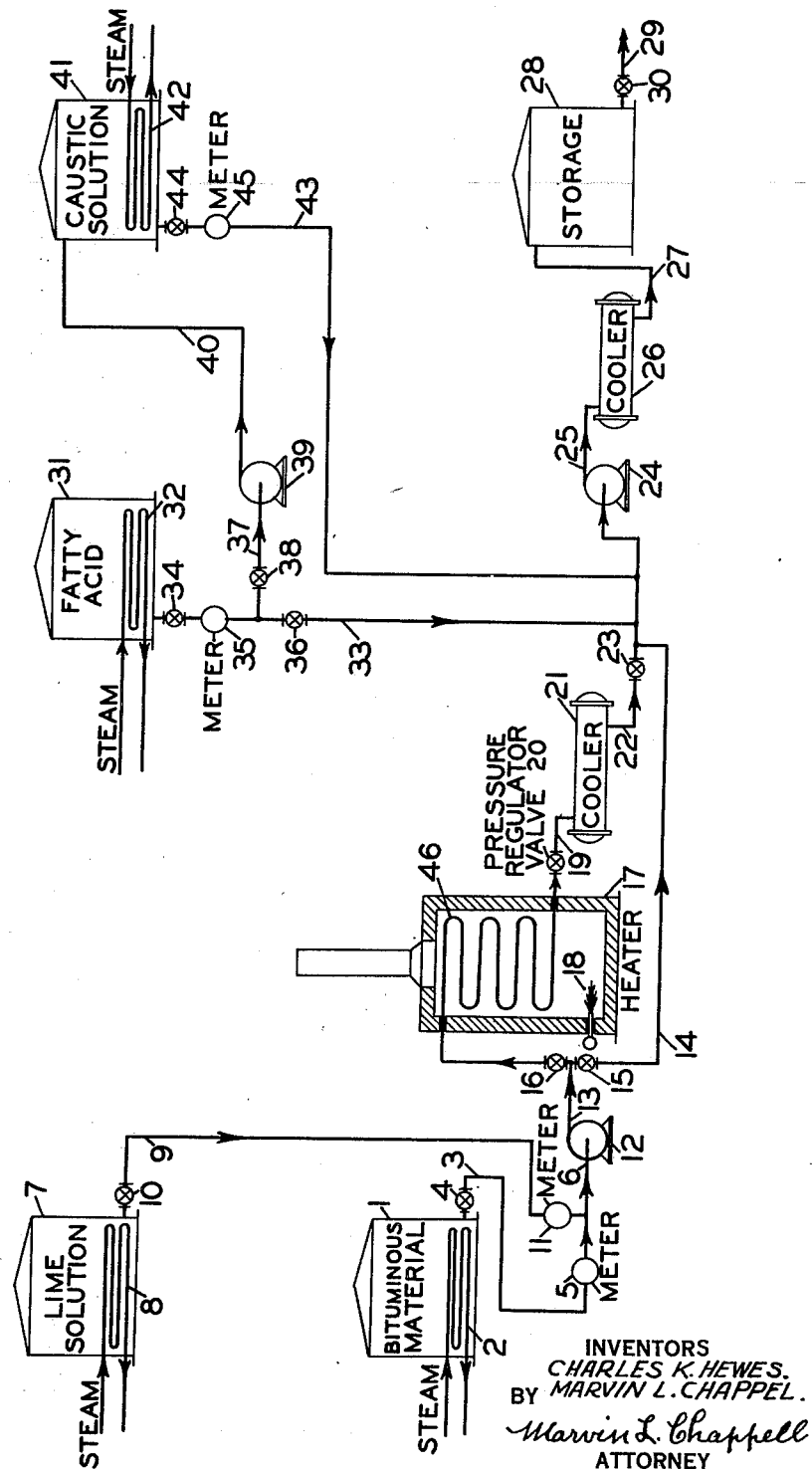

2,083,499

UNITED STATES PATENT OFFICE 2,083,499

PROCESS OF PRODUCING AQUEOUS BITUMINOUS EMULSIONS

Charles K. Hewes, Los Angeles, and Marvin L. Chappell, Watson, Calif., assignors, by mesne assignments, to Richfield Oil Corporation, Los Angeles, Calif., a corporation of Delaware Original application October 22, 1935, Serial No. 46,108. Divided and this application March 2, 1936, Serial No. 66,614

6 Claims. (Cl. 134—1)

This invention relates to an improved aqueous bituminous emulsion and process of producing the same, for use in repairing or constructing asphalt macadam surface courses, such as roadways, tennis courts, play grounds, factory floors and the like, where a lasting surface is required to prevent excessive erosion due to traffic.

This application is a division of our application Serial #46,108, filed October 22, 1935, for Aqueous bituminous emulsions and process of producing the same.

The present general method of constructing asphalt or bituminous macadam courses is to cement layers of compacted stone aggregate with bituminous material such as asphalt or asphaltic oil, the asphalt or asphaltic oil being generally applied to the compacted stone aggregate at elevated temperatures, or at normal temperatures when emulsified with water, to render the asphalt or bitumen sufficiently mobile so that an even distribution is obtained to coat the stone aggregate as completely as possible without use of excessive amounts, in order that there will be no surplus asphalt to rise to the surface of the completed pavement.

Much trouble has been experienced in the construction and repair of asphalt macadam roads due to uneven distribution of the asphaltic content of water emulsions over the compacted stone aggregate, causing the surface courses to become sticky, or shifted and uneven in places after being subjected to traffic conditions.

Now we have determined that the uneven distribution of asphalt over stone aggregate from water emulsions is primarily due to the lack of sensitivity of the emulsion to coagulate and precipitate the asphalt evenly when contacted with stone aggregate having relatively small adsorption properties and insufficient natural salt precipitating agents or electrolytes.

We have discovered that the sensitivity of asphalt in water emulsions to coagulate and precipitate may be increased by adding to or dissolving in the asphalt before emulsifying a small quantity of a hydrophobe, such as a water insoluble metal soap of an organic carboxyl acid, which may be calcium, strontium, barium, magnesium, iron, aluminum, chromium, zinc, and the like, or the naturally occurring carboxyl acids in petroleum oils, naphthenic acids, or fatty acids (stearic, oleic, palmitic, etc.), and/or the hydrophobe with respect to water may be the decomposition produced by heating the metal soap dissolved in the asphalt to an elevated temperature ranging from about 400 to 600° F., in accordance with the following chemical reactions, to produce ketones and calcium carbonate, as illustrated by Reaction 1, or products as shown by Reaction 2 consisting of calcium carbonate and hydrocarbons represented by the general formula 2RH, in which R is a hydrocarbon radical and H hydrogen:

1. 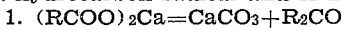 $(RCOO)_2Ca = CaCO_3 + R_2CO$
2. 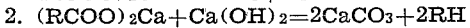 $(RCOO)_2Ca + Ca(OH)_2 = 2CaCO_3 + 2RH$ We prefer to employ the naturally occurring petroleum carboxyl acids contained in the asphalt by neutralizing the asphalt before emulsification with a water solution or suspension of a metal compound capable of forming hydrophobes with respect to water in the asphalt, preferably using a hydroxide, oxide or carbonate of any of the above enumerated metals to form the corresponding soap or salt. Preferably, however, calcium hydroxide is employed. Thereafter, the neutralized asphalt is emulsified with the desired quantity of water, using any of the known water soluble hydrophilic colloids as emulsifying agents, such as an alkali soap of any of the fatty acids, and preferably stearic, oleic, palmitic, and the like organic acid salts or soaps.

The term "sensitized" is to be taken to mean the action of a hydrophobe on a hydrophile or hydrophilic colloid, by means of which asphalt-in-water emulsions become more easily coagulated by electrolytes, or coagulated by adsorption or absorption when contacted with solids such as stone aggregate having insufficient natural salt precipitating agents.

The term "hydrophile" is to be taken to mean an emulsion or system with a marked affinity between two phases, and the term "hydrophobe" where there is an absence of affinity between the two phases.

An object of the invention is to produce sensitized asphalt-in-water emulsions which will readily coagulate or peptize when mixed with stone aggregate.

Another object of the invention is to produce asphalt-in-water emulsions which will contain essentially only one type of colloidal ion which will readily coagulate and precipitate the asphalt content of the emulsion when contacted with aggregate having adsorptive or absorptive properties.

Another object of the invention is to produce sensitized asphalt-in-water emulsions by converting the natural petroleum carboxyl acids contained therein into hydrophobes with respect to water, such as water insoluble soaps or decomposition products thereof, and then emulsifying the treated asphalt containing the water insoluble soaps with an alkaline water solution of a hydroyphilic colloid.

Various other objects and advantages of the present invention will be apparent from the description of the preferred form or example of the process for making the new product embodying the invention.

For this purpose reference is made to the accompanying drawing, in which there is illustrated one form of apparatus in which the invention may be performed. The drawing represents a diagrammatical view of the apparatus in which the parts are in vertical section.

In the drawing, 1 represents generally a tank for holding bituminous material such as asphalt to be emulsified, and 2 a steam coil for heating the asphalt so that it may be maintained in a fluid condition. Pipe 3, controlled by valve 4, connects tank 1 to meter 5. Pipe 6 connects the outlet from meter 5 to the inlet of centrifugal mixer pump 12.

7 represents a tank for holding a water solution or suspension of lime, which may be calcium hydroxide and/or any other metal hydroxide which will form water insoluble soaps that are soluble in the bituminous material or asphalt to be emulsified. Tank 7 is provided with a steam heating coil 8 for maintaining the hydroxide solution or suspension at the emulsifying temperature. Pipe 9, controlled by valve 10, connects lime solution tank 7 to meter 11, the outlet side of which is connected to pipe 6.

Pipe 13 connects the discharge side of centrifugal mixer pump 12 to pipe 14. Pipe 14, controlled by valves 15 and 16, connects pipe 13 to heater coil 46, and also to pipe 22. Heater coil 46 is stationed in the upper section of heater 17. Heater 17 is provided with a burner 18. Pipe 19, controlled by pressure regulating valve 20, connects the discharge side of coil 46 to cooler 21. Cooler 21 is provided with inlet and outlet connections not shown for passing water or other cooling fluid through the cooling section of that cooler. Pipe 22, controlled by valve 23, connects the discharge side of cooler 21 to the inlet of centrifugal mixer pump 24.

31 represents a tank for holding fatty acids, and is provided with a steam heater coil 32 for maintaining the fatty acids at the reaction and emulsifying temperature. Pipe 33, controlled by valves 34 and 36, connects tank 31 at the bottom to pipe 22. By means of meter 35 the quantity of fatty acids passing through pipe 33 can be determined. Pipe 37, controlled by valve 38, connects pipe 33 to the inlet of pump 39.

Pipe 40 connects the discharge side of pump 39 to caustic solution tank 41 near the top, by means of which the fatty acids or portions thereof used in the emulsifying operation can be mixed with the caustic solution before use. Caustic solution tank 41 is provided with a steam heater coil 42 for maintaining the caustic solution at the emulsifying temperature employed. Pipe 43, controlled by valve 44, connects caustic solution tank 41 at the bottom to pipe 22. By means of meter 45 the quantity of caustic solution passing through pipe 43 can be determined.

Pipe 25 connects the discharge side of pump 24 to cooler 26. Cooler 26 is provided with inlet and outlet connections for passing water or other cooling fluid through the cooling section of that cooler. Pipe 27 connects the discharge side of cooler 26 to storage tank 28 near the top. Pipe 29, controlled by valve 30, connects storage tank 28 near the bottom to other storage not shown.

The preferred process as carried out in the apparatus just described is as follows:

Bitumen, such as asphalt or asphaltic oil which will meet any of the required standard specifications for highway construction, is maintained in tank 1 in a fluid, pumpable condition by the continuous application of heat from steam coil 2, through which steam or other heating fluid is continuously passed. For bituminous material having penetrations ranging from, say, 150 to 300, the temperature of the bitumen or bituminous oil in tank 1 ranges from about 150 to 210° F., although higher or lower temperatures may be employed, depending upon the grade of bituminous material to be emulsified and the degree of emulsification required. From tank 1 the hot bituminous material flows through pipe 3, meter 5, and into pipe 6, the rate of flow being determined by meter 5 and controlled by operation of valve 4.

7 is a tank for holding a water solution or suspension of a metal compound capable of forming hydrophobes or water insoluble metal soaps with the natural occurring organic acids contained in bitumen or asphalt, and/or with fatty acids which may be added to the asphalt or bituminous oil before emulsification in case it contains an insufficient amount of natural acid to be effective as a sensitizer. The metal compounds employed may be the hydroxides, oxides or carbonates of any of the above enumerated metals, and preferably a lime solution or suspension of calcium hydroxide. Although higher or lower temperatures may be employed, the lime solution or suspension in tank 7 is preferably maintained at a temperature ranging from about 150 to 210° F. by passing steam or other heating fluid through coil 8.

From tank 7 the hot lime solution passes through pipe 9, meter 11, and into pipe 6, the rate of flow being determined by meter 11 and controlled by operation of valve 10. Pipe 6 conducts the heated mixture of bituminous material and lime solution into centrifugal mixer pump 12, and the mixture is therein commingled and the natural or added acids neutralized, with the formation of hydrophobes or water insoluble soaps or salts. Pump 12 discharges the neutralized bituminous material and water content, or water content and excess lime solution, through pipe 13 and into pipe 14. In case it is desired to produce the sensitization of the emulsion to be formed by water insoluble metal soaps, rather than the heat decomposition products thereof, valve 15 is opened and valve 16 closed, and the mixture passes through the lower section of pipe 14 and directly into pipe 22.

If decomposition products of the metal soaps are to be employed as the sensitizing agent, valve 15 is closed and valve 16 is opened, whereby the mixture passes from pipe 14 through heater coil 46. The bituminous mixture containing the metal soaps, passing through heater coil 46, is heated to a temperature ranging from about 400 to 600° F., which is sufficient to convert the metal soaps into ketones without substantial decomposition or cracking of the bitumen. If hydrocarbon products are to be produced by decomposition of the metal soaps rather than ketones, such will be formed under the same conditions of temperature and pressure as the ketones if twice the quantity of lime or calcium hydroxide necessary for neutralizing the organic acids in the bitumen is employed, in accordance with the chemical Reaction 2 heretofore shown and described.

From heater coil 46 the hot bituminous material and soap decomposition products, either ketones or polymerized products, pass through pipe 19 and into cooler 21, controlled by pressure regulating valve 20. Pressure regulating valve 20 is preferably set so as to maintain the mixture passing through coil 46 under pressure sufficient to prevent any substantial vaporization of the water content. The bituminous material, containing water and soap decomposition products, is cooled to any desirable, suitable emulsifying temperature in its passage through cooler 21, preferably to a temperature of about 150 to 210° F. From cooler 21 the bituminous mixture containing the required percentage of hydrophobes with respect to water, which preferably ranges from about one-half to three per cent, passes into pipe 22 which is connected to centrifugal pump mixer 24, controlled by valve 23.

Tank 31 contains a bulk supply of fatty acids such as oleic, stearic, palmitic, or other like organic acids, which are preferably maintained at a temperature of about 150 to 210° F. by passing a regulated supply of steam or other heating fluid continuously through heater coil 32. From tank 31 a regulated stream supply of fatty acids, ranging from about one-half to two per cent by volume of the bitumen to be emulsified, is continuously introduced into the neutralized bituminous mixture as it passes through pipe 22, through pipe 33 and meter 35, the flow being controlled by operation of valves 34 and 36.

A caustic solution, such as a water solution of sodium or potassium hydroxide, is also continuously introduced into the bituminous mixture as it passes through pipe 22, in quantities sufficient to neutralize all the introduced fatty acids, so as to form water soluble soaps or hydrophilic colloids, preferably using an excess quantity of the caustic solution with sufficient water to make an emulsion containing from 40 to 63 per cent bitumen or asphalt. A bulk supply of the caustic soda solution is preferably maintained in tank 41 at a temperature ranging from about 150 to 210° F. by passing steam or other heating fluid through steam coil 42. The caustic solution continuously passes in stream flow from tank 41 through pipe 43, valve 44, meter 45, and into pipe 22 during the emulsification operation.

The bituminous mixture, containing the required amounts of hydrophobes with respect to water, and hydrophiles dissolved in the required amount of alkaline water, passes from pipe 22 into centrifugal mixer pump 24 and is therein sufficiently commingled to produce the desired emulsion, preferably at a temperature ranging from about 150 to 210° F. Centrifugal mixer pump 24 discharges the bituminous emulsion through pipe 25, cooler 26 and pipe 27 into storage tank 28, from where it may be conveyed to other storage or places of use through pipe 29, controlled by valve 30.

If desired, the hydrophilic colloid used to effect the emulsification of the bitumen and water may be formed before being mixed with the bitumen, which is carried out by pumping and commingling the required amount of the fatty acids from tank 31 into a batch lot of the caustic solution contained in tank 41, the fatty acids passing from tank 31 through pipe 33, valve 34, meter 35, pipe 37, valve 38, pump 39, pipe 40, and then into tank 41, with valve 36 closed; or a portion of the fatty acids may be introduced into tank 41 and the remainder into the bituminous stream prior to introduction of the caustic solution.

The following illustrates one type of emulsion that can be manufactured by our invention:

A standard sample of asphaltic oil made from Kern County, California, crude petroleum oil, which conformed to the requirements under Section 70, as specified by the State of California, Department of Public Works, Division of Highways, 1935, for asphalt for making emulsions, containing 93.7% asphalt and having an organic acidity equivalent to 1.1 milligrams of potassium hydroxide per gram of asphaltic oil, was neutralized with a water solution of calcium hydroxide, using 0.73 milligram of calcium hydroxide per gram of asphaltic oil, which was the calculated amount of calcium hydroxide required to neutralize the asphalt without excess.

This neutralized sample of asphaltic oil, containing the calcium soaps formed by the neutralization, was emulsified with an alkaline water solution of sodium oleate, containing about 0.25% by weight free caustic hydroxide, with water in quantity sufficient to make an emulsion containing 56% by volume bituminous oil. The amount of oleic acid used to make the sodium oleate was 0.75% by volume, per volume of emulsion. The sample of asphaltic emulsion thus made conformed to all the requirements under Section 71, specified by the State of California, Department of Public Works, Division of Highways, for asphaltic emulsions.

While the process herein described is well adapted for carrying out the objects of the present invention, various modifications and changes may be made without departing from the spirit of the invention, and the invention includes all such modifications as appear within the scope of the appended claims.

We claim:

1. A process of producing bitumen-in-water emulsions, sensitized to coagulate by adsorption and absorption when contacted with stone aggregate substantially void of natural salt precipitating agents, comprising, neutralizing bitumen with a metal hydroxide of the alkali earth metals, capable of forming oil soluble and water insoluble metal soaps with the naturally occurring petroleum acids contained therein, heating the neutralized bitumen at a reaction temperature of 400 to 600° F. to produce oil soluble ketones by decomposition of the said metal soaps, and then emulsifying the bitumen containing the ketones with alkaline water containing an alkali soap of a fatty acid.

2. A process of producing bitumen-in-water emulsions, sensitized to coagulate by adsorption and absorption when contacted with stone aggregate substantially void of natural salt precipitating agents, comprising, neutralizing bitumen with an excess quantity of a metal hydroxide of the alkali earth metals, capable of forming oil soluble and water insoluble metal soaps with the naturally occurring petroleum acids contained therein, heating the neutralized bitumen at a reaction temperature of 400 to 600° F. to produce emulsifiable oil soluble decomposition products of the said metal soaps, and then emulsifying the bitumen containing the said produced hydrocarbons with alkaline water containing an alkali soap of a fatty acid.

3. A process of producing bitumen-in-water emulsions, sensitized to coagulate by adsorption and absorption when contacted with stone aggregate substantially void of natural salt precipitating agents, comprising, neutralizing bitumen with calcium hydroxide and forming oil soluble and water insoluble soaps with the naturally occurring petroleum acids contained therein, heating the neutralized bitumen at a reaction temperature of 400 to 600° F. to produce oil soluble ketones by decomposition of the said calcium soaps, and then emulsifying the bitumen containing the ketones with alkaline water containing an alkali soap of a fatty acid.

4. A process of producing bitumen-in-water emulsions, sensitized to coagulate by adsorption and absorption when contacted with stone aggregate substantially void of natural salt precipitating agents, comprising, neutralizing bitumen with an excess quantity of calcium hydroxide and forming oil soluble and water insoluble calcium soaps with the naturally ocurring petroleum acids contained therein, heating the neutralized bitumen containing the excess calcium hydroxide at a reaction temperature of 400 to 600° F. to produce emulsifiable oil soluble decomposition products of the said metal soaps, and then emulsifying the bitumen containing the said produced hydrocarbons with alkaline water containing an alkali soap of a fatty acid.

5. A process of producing bitumen-in-water emulsions, sensitized to coagulate by adsorption and absorption when contacted with stone aggregate substantially void of natural salt precipitating agents, as in claim 4, in which the excess quantity of calcium hydroxide added to the bitumen is twice the quantity necessary to neutralize the naturally occurring petroleum acids.

6. The improvement in the process of producing bitumen-in-water emulsions which comprises, mixing bitumen with twice the quantity of calcium hydroxide necessary to neutralize the petroleum acids contained in the bitumen, heating the mixture to a reaction temperature of 400 to 600° F., and thereafter emulsifying the treated mixture with alkaline water containing an alkali soap of a fatty acid.

CHARLES K. HEWES.
MARVIN L. CHAPPELL.